(12) United States Patent
Hibbler et al.

(10) Patent No.: US 9,469,165 B2
(45) Date of Patent: Oct. 18, 2016

(54) AXLE ASSEMBLY HAVING WHEEL HUBS CONFIGURED FOR USE IN VEHICLE WITH CENTRAL TIRE INFLATION SYSTEM

(71) Applicant: American Axle & Manufacturing, Inc., Detroit, MI (US)

(72) Inventors: John C. Hibbler, Lake Orion, MI (US); James W. Platt, New Haven, IN (US)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

(21) Appl. No.: 14/883,723

(22) Filed: Oct. 15, 2015

(65) Prior Publication Data

US 2016/0031271 A1    Feb. 4, 2016

Related U.S. Application Data

(63) Continuation of application No. 14/162,920, filed on Jan. 24, 2014, now Pat. No. 9,162,539.

(51) Int. Cl.
*B60C 5/22* (2006.01)
*B60C 23/00* (2006.01)
*B60B 27/00* (2006.01)
*B60B 27/02* (2006.01)

(52) U.S. Cl.
CPC ......... *B60C 23/003* (2013.01); *B60B 27/0047* (2013.01); *B60B 27/0073* (2013.01); *B60B 27/02* (2013.01); *B60Y 2200/10* (2013.01); *B60Y 2200/14* (2013.01)

(58) Field of Classification Search
CPC .................................................. B60C 23/003
USPC ................................................ 152/416, 417
See application file for complete search history.

(56) References Cited

U.S. PATENT DOCUMENTS

| | | | |
|---|---|---|---|
| 4,804,027 A | 2/1989 | Runels | |
| 5,080,156 A * | 1/1992 | Bartos | B60C 23/003 152/415 |
| 5,080,157 A * | 1/1992 | Oerter | B25B 23/08 152/417 |
| 5,174,839 A * | 12/1992 | Schultz | B60C 23/003 152/415 |
| 5,203,391 A * | 4/1993 | Fox | B60C 23/003 152/415 |
| 5,253,688 A * | 10/1993 | Tigges | B60C 23/003 152/417 |
| 6,199,611 B1 * | 3/2001 | Wernick | B60C 23/003 152/417 |
| 6,668,888 B1 | 12/2003 | Beesley et al. | |
| 6,719,028 B2 * | 4/2004 | D'Amico | B60C 23/003 152/415 |
| 7,207,365 B2 * | 4/2007 | Nelson | B60C 23/003 152/415 |
| 7,690,412 B1 * | 4/2010 | Jenkinson | B60C 23/003 152/416 |
| 8,052,400 B2 * | 11/2011 | Isono | B60C 23/003 152/417 |
| 8,915,274 B2 * | 12/2014 | Eschenburg | B60C 23/003 152/416 |
| 2002/0112802 A1 * | 8/2002 | D'Amico | B60C 23/003 152/415 |

(Continued)

*Primary Examiner* — Jeffrey J Restifo (74) *Attorney, Agent, or Firm* — Harness, Dickey & Pierce, P.L.C.

(57) ABSTRACT

An axle assembly, including an axle shaft, annular member, hub, inner and outer hub bearings, abutment ring, first and second seals, and an air inlet port. The annular member is disposed about the axle shaft. The hub is coupled for rotation with the axle shaft and defines an outlet port. The first and second shaft seals form seals between the hub and the annular member. The air inlet port is mounted to one of the annular member and the abutment ring and includes an inlet boss. A first fluid conduit is defined by the abutment ring or both the abutment ring and the inlet port. The first fluid conduit is in fluid communication with the air inlet boss. The second shaft seal is spaced apart from the first shaft seal along the rotational axis to at least partially define a second fluid conduit in fluid communication inlet and outlet ports.

16 Claims, 5 Drawing Sheets

(56) References Cited

U.S. PATENT DOCUMENTS

| | | | | |
|---|---|---|---|---|
| 2005/0205182 A1* | 9/2005 | Maquaire | B60C 23/003 | 152/417 |
| 2009/0101261 A1* | 4/2009 | Collet | B60C 23/003 | 152/417 |
| 2009/0283190 A1* | 11/2009 | Padula | B60C 23/003 | 152/417 |
| 2009/0311112 A1* | 12/2009 | Isono | B60C 23/003 | 417/233 |
| 2010/0147429 A1* | 6/2010 | Gonska | B60C 23/003 | 152/417 |
| 2010/0181739 A1* | 7/2010 | Eschenburg | B60C 23/003 | 280/124.125 |
| 2013/0228258 A1* | 9/2013 | Knapke | B60B 35/00 | 152/415 |
| 2014/0261941 A1* | 9/2014 | Knapke | B60C 23/003 | 152/417 |
| 2015/0047764 A1* | 2/2015 | Tiziani | B60C 23/003 | 152/417 |
| 2015/0059945 A1* | 3/2015 | Flory | B60C 23/003 | 152/417 |
| 2015/0059946 A1* | 3/2015 | Keeney | B62D 35/00 | 152/417 |
| 2015/0075688 A1* | 3/2015 | Keeney | B60C 23/003 | 152/417 |
| 2015/0101722 A1* | 4/2015 | Lakin | B60C 23/003 | 152/417 |
| 2015/0210124 A1* | 7/2015 | Hibbler | B60C 23/003 | 152/417 |
| 2015/0352911 A1* | 12/2015 | Bittlingmaier | B60C 23/16 | 152/417 |

\* cited by examiner

AXLE ASSEMBLY HAVING WHEEL HUBS CONFIGURED FOR USE IN VEHICLE WITH CENTRAL TIRE INFLATION SYSTEM

CROSS-REFERENCE TO RELATED APPLICATIONS

This application is a continuation of U.S. patent application Ser. No. 14/162,920 filed Jan. 24, 2014 (issued as U.S. Pat. No. 9,162,539 on Oct. 20, 2015), the disclosure of which is incorporated by reference as if fully set forth herein.

FIELD

The present disclosure relates to an axle assembly having wheel hubs configured for use in a vehicle with a central tire inflation system.

BACKGROUND

This section provides background information related to the present disclosure which is not necessarily prior art.

Onboard central tire inflation systems ("CTI systems") are used on many types of vehicles to provide pressurized air to inflate, or maintain tire pressure from a centralized unit. However, current CTI systems are bulky or complex, leading to increased cost, size, and weight of the CTI systems and vehicles employing them. As such, there is a need for more compact CTI systems.

SUMMARY

This section provides a general summary of the disclosure, and is not a comprehensive disclosure of its full scope or all of its features.

The present teachings provide for an axle assembly including an annular member, a hub, inner and outer hub bearings, a first shaft seal, a second shaft seal, and an air inlet port. The annular member is disposed about a rotational axis and includes an inboard end. The hub is coupled to the annular member for rotation about the rotational axis and is configured to be coupled to a wheel. The hub defines an outlet port. The inner and outer hub bearings support the hub for rotation on the annular member. The abutment ring is fixedly mounted to the annular member. The first shaft seal forms a seal between the hub and the annular member. The second shaft seal forms a seal between the hub and the annular member. The air inlet port is mounted to one of the annular member and the abutment ring. The air inlet port has an inlet boss. A first fluid conduit is defined by the abutment ring or both the abutment ring and the inlet port. The first fluid conduit is in fluid communication with the air inlet boss. The second shaft seal is spaced apart from the first shaft seal along the rotational axis to at least partially define a second fluid conduit. The second fluid conduit couples the outlet port in fluid communication with the first fluid conduit.

The present teachings further provide for an axle assembly including inboard and outboard ends, a steering knuckle, a hub, inner and outer hub bearings, first and second seals, and an abutment ring. The steering knuckle includes an annular member, and an air inlet port. The annular member is disposed about a rotational axis. The annular member includes an outer radial surface, an inner radial surface, and a channel defined by the outer radial surface. The air inlet port is disposed within the steering knuckle at the inboard end. The air inlet port includes an inlet boss extending radially inward from an outer surface of the steering knuckle and terminating radially outward of the inner radial surface of the annular member. The hub is rotatably coupled to the annular member for rotation about the rotational axis, and includes an outer radial surface, an inner radial surface, and an outlet port. The outlet port includes an outlet boss extending from an outboard surface of the hub toward the inboard end. The inner and outer hub bearings are disposed between the steering knuckle and the inner radial surface of the hub, and are configured to allow rotation of the hub about the steering knuckle. The outer hub bearing is disposed outboard of the inner hub bearing and radially inward of the outlet port. The first seal is disposed outboard of the inner hub bearing and radially between the hub and the steering knuckle, and configured to form a seal therebetween. The second seal is disposed outboard of the first seal, inboard of the outer hub bearing, and radially between the hub and the steering knuckle, and configured to form a seal therebetween. The abutment ring is disposed inboard of the inner hub bearing. The abutment ring has an inboard portion and an outboard portion. The outboard portion is radially between the hub and the outer radial surface of the annular member. The inboard portion extends radially outward from the outboard board portion. The abutment ring defines a first pocket in fluid communication with the inlet boss. The first pocket extends from the inlet boss and toward the outboard end. The channel extends from the first pocket toward the outboard end and terminates inboard of the outer hub bearing. The channel is radially inward of the inner hub bearing and the first seal. The annular member, the hub, and the first and second seals define a second pocket that extends radially outward from the channel, axially between the first and second seals, and terminates radially inward of the outer radial surface of the hub. The second pocket is in fluid communication with the outlet port.

The present teachings further provide for an axle assembly including inboard and outboard ends, an axle shaft, an axle housing, a hub, inner and outer hub bearings, first and second seals, and an abutment ring. The axle shaft is rotatably disposed about a rotational axis and adapted on the outboard end to drive a wheel. The axle housing includes an annular member disposed about the axle shaft. The annular member includes an outer radial surface, an inner radial surface, and a channel defined by the outer radial surface. The hub is coupled to the axle shaft and includes an outer radial surface, an inner radial surface, and an outlet port. The outlet port includes an outlet boss extending from an outboard surface of the hub toward the inboard end. The inner and outer hub bearings are disposed between the axle housing and the inner radial surface of the hub, and are configured to allow rotation of the hub about the axle housing. The outer hub bearing is disposed outboard of the inner hub bearing and radially inward of the outlet port. The first seal is disposed outboard of the inner hub bearing and radially between the hub and the axle housing, and configured to form a seal therebetween. The second seal is disposed outboard of the first seal, inboard of the outer hub bearing, and radially between the hub and the axle housing, and configured to form a seal therebetween. The abutment ring is disposed inboard of the inner hub bearing. The abutment ring has an inboard portion and an outboard portion. The outboard portion is radially between the hub and the outer radial surface of the annular member. The inboard portion extends radially outward from the outboard board portion. The abutment ring defines an air inlet port including an inlet boss extending radially inward from an outer radial surface of the abutment ring. A first fluid conduit is defined by the abutment ring or both the abutment ring and the outer radial surface of the annular member. The first fluid conduit extends from the inlet boss and toward the outboard end of the annular member. The channel extends from the first pocket toward the outboard end and terminates inboard of an outer hub bearing. The channel is radially inward of the inner hub bearing and the first seal. The annular member, the hub, and the first and second seals define a second pocket that extends radially outward from the channel, axially between the first and second seals, and terminates radially inward of the outer radial surface of the hub. The second pocket is in fluid communication with the outlet port.

The present teachings further provide for an axle system for use with central tire inflation systems including an annular member, a hub, an abutment ring, an air inlet port, a first pocket, at least one channel, a first and second seal, a second pocket, and an outlet port. The annular member is disposed about a rotational axis of an axle. The annular member includes an inboard end, an outboard end, an outer radial surface, and an inner radial surface. The outboard end is proximal to a wheel. The inboard end is axially opposite the outboard end and distal to the wheel. The hub is disposed about the rotational axis of the axle and rotatably coupled to the annular member to allow rotation of the hub about the rotational axis of the axle. The hub includes an inboard end, an outboard end, an outer radial surface, and an inner radial surface. The outboard end of the hub is proximal to the wheel. The inboard end of the hub axially opposite the outboard end of the hub and distal to the wheel. The inner radial surface of the hub is supported about the annular member by an inner hub bearing. The abutment ring is disposed inboard of the inner hub bearing. The abutment ring has an inboard portion and an outboard portion. The outboard portion extends axially toward the outboard end of the annular member and is radially between the hub and the outer radial surface of the annular member. The inboard portion extends axially toward the inboard end of the annular member and radially outward from the outboard board portion. The air inlet port is disposed at the inboard end of the annular member, and includes an inlet boss extending radially inward from an outer radial surface of one of the annular member and the abutment ring. The first pocket is defined by the abutment ring and the annular member. The first pocket is in fluid communication with the inlet boss. The first pocket extends from the inlet boss and toward the outboard end of the annular member. The at least one channel is defined by the outer radial surface of the annular member. The at least one channel extends from the first pocket toward the outboard end of the annular member, and terminates inboard of an outer hub bearing. The at least one channel is radially inward of the inner hub bearing. The first seal is disposed outboard of the inner hub bearing, radially outward of the at least one channel, and radially between the hub and the annular member. The first seal is configured to form a hermetic seal between the hub and the annular member, while allowing rotation of the hub about the annular member. The second seal is disposed outboard of the first seal, inboard of the outer hub bearing, and radially between the hub and the annular member. The second seal is configured to form a hermetic seal between the hub and the annular member, while allowing rotation of the hub about the annular member. The second pocket is defined by the annular member, the hub, and the first and second seals. The second pocket extends radially outward from the at least one channel and is in fluid communication with the at least one channel. The second pocket extends between the first and second seals, and terminates radially inward of the outer radial surface of the hub. The outlet port is in fluid communication with the second pocket. The outlet port includes an outlet boss extending from an outboard surface of the hub toward the inboard end of the hub. The outlet port is radially outward of the outer bearing. The axle system may further include a channel ring disposed radially inward of the first and second seals, radially outward of the outer radial surface of the annular member, and axially between the inner and outer bearings. The channel ring abuts an outboard side of the inner hub bearing and forms a seal therebetween. The inlet boss may extend radially inward from an outer radial surface of the annular member to join with the first pocket. The inlet boss may extend radially inward from an outer radial surface of the abutment ring to join with the first pocket. The outboard portion of the abutment ring may abut an inboard side of the inner hub bearing and form a seal therebetween. The at least one channel may be positioned on a compressive stress quadrant of the annular member and an unloaded section of the inner hub bearing. The at least one channel may include a plurality of channels. The annular member may be coupled to a steering knuckle. The annular member may be an axle housing configured to house an axle shaft.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

The present teachings are directed to an axle assembly for use with a central tire inflation system. The axle assembly can be incorporated in a vehicle, such as an automobile, sport utility vehicle, truck, tractor, machine, or any other vehicle having inflatable tires. The axle assembly conveys pressurized air from the central tire inflation system to the tires of the vehicle to inflate the tires or maintain a predetermined pressure within the tires. While the present teachings refer to "air" as the inflation gas, it is understood that the system can be used with other gasses or mixtures of gasses to maintain tire inflation, such as nitrogen for example. Accordingly, the term "air" used herein is defined as encompassing those other inflation gasses or mixtures.

Figure 1:
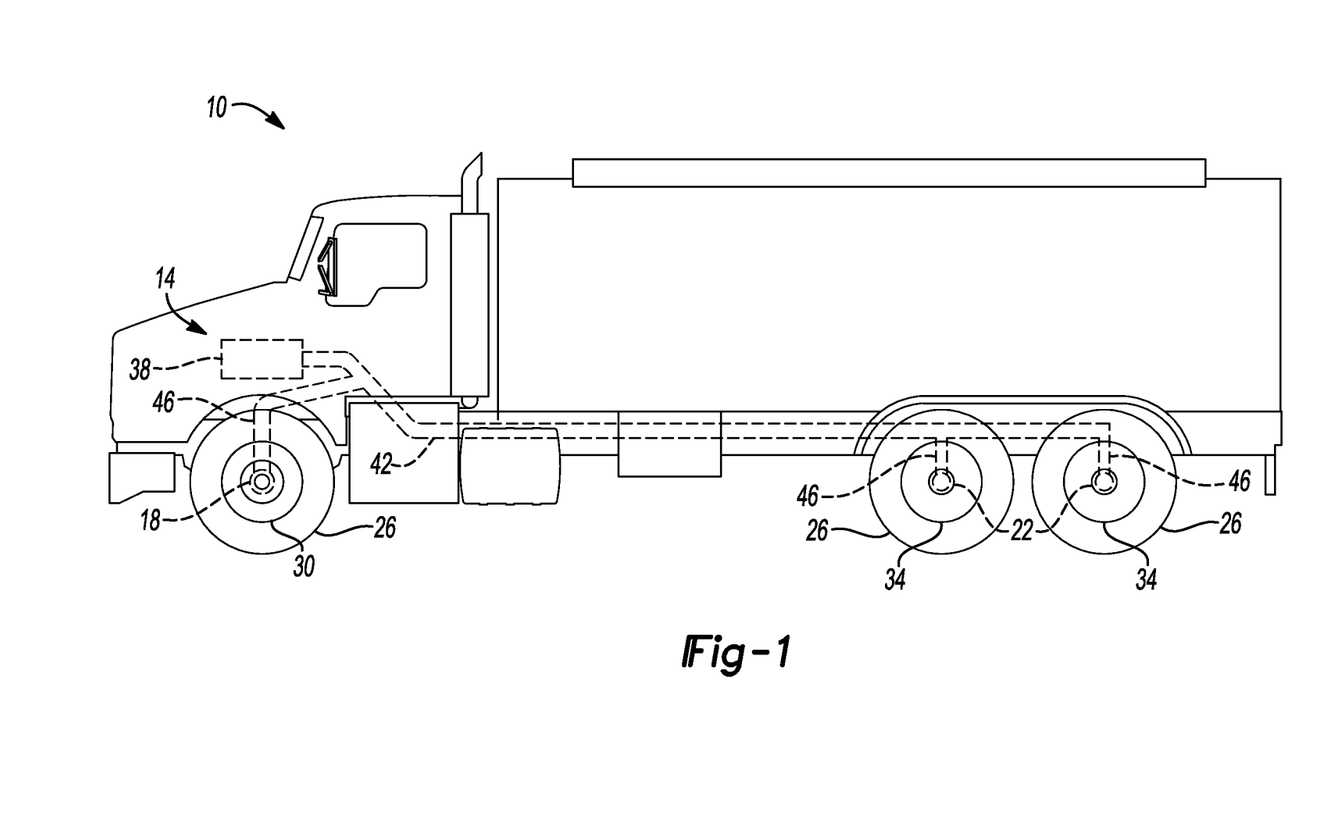
FIG. 1 is a representative vehicle including a central tire inflation system with front and rear axle assemblies in accordance with the present teachings.

FIG. 1 illustrates a side view of an exemplary vehicle 10 having a central tire inflation system ("CTIS") 14, a front axle assembly 18, and a rear axle assembly 22. While the vehicle 10 is illustrated as a truck, it is understood that any appropriate type of vehicle may be used in accordance with the present teachings. It is also understood that while the CTIS 14 of the exemplary vehicle is coupled to the front axle assembly 18 and the rear axle assembly 22 to distribute pressurized air thereto, as will be explained further, the CTIS 14 may alternatively be coupled to only the front or only the rear axle assemblies 18, 22. Furthermore, the exemplary vehicle 10 shown has six axle assemblies configured to be coupled to six wheels having tires 26: left front wheel 30, two left rear wheels 34, and complementary right side wheels (not shown). However, it is understood that a vehicle may have any number of front and/or rear axle assemblies configured to be coupled to any number of wheels, such as a vehicle with only two rear wheels, or with more rear wheels for example. Additionally, it is understood that the rear axle assemblies can be located on a detachable trailer, such as on a tractor trailer vehicle for example.

The CTIS 14 can include an air supply 38 and at least one conduit 42. The air supply 38 can be any type of device configured to provide pressurized air to the conduit 42, such as a pump or a container of pressurized air for example. In the case of the air supply 38 being a pump, the pump can be driven by any number of means, such as an electrical motor, the vehicle engine, or an auxiliary engine for example. The conduit 42 can be coupled for fluid communication with the air supply 38. The conduit 42 can include any number of branches 46 running to any number of front and rear axle assemblies 18, 22 to convey the pressurized air thereto.

Figure 2:
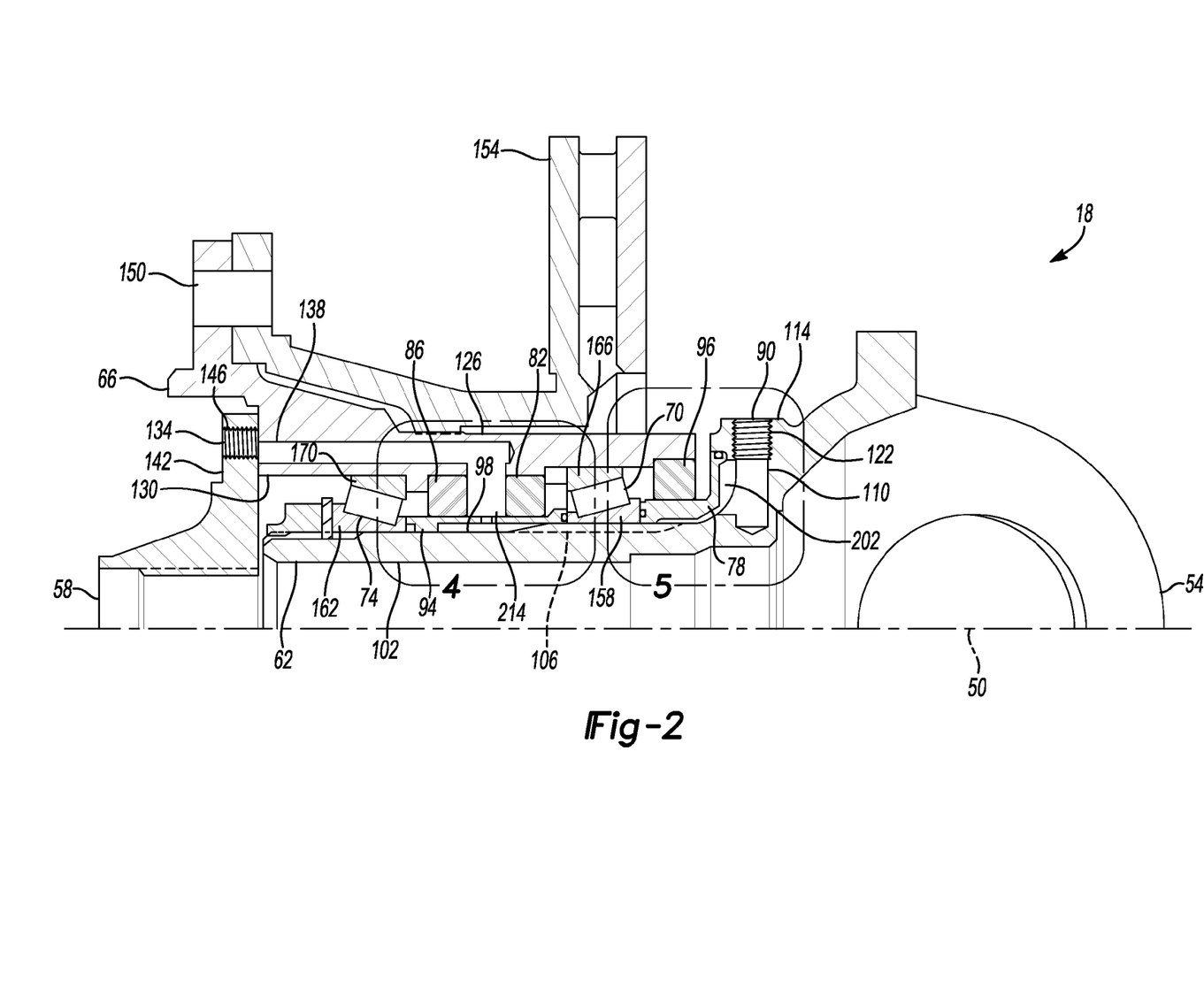
FIG. 2 is a cross-section view of the front axle assembly of FIG. 1.
Figure 3:
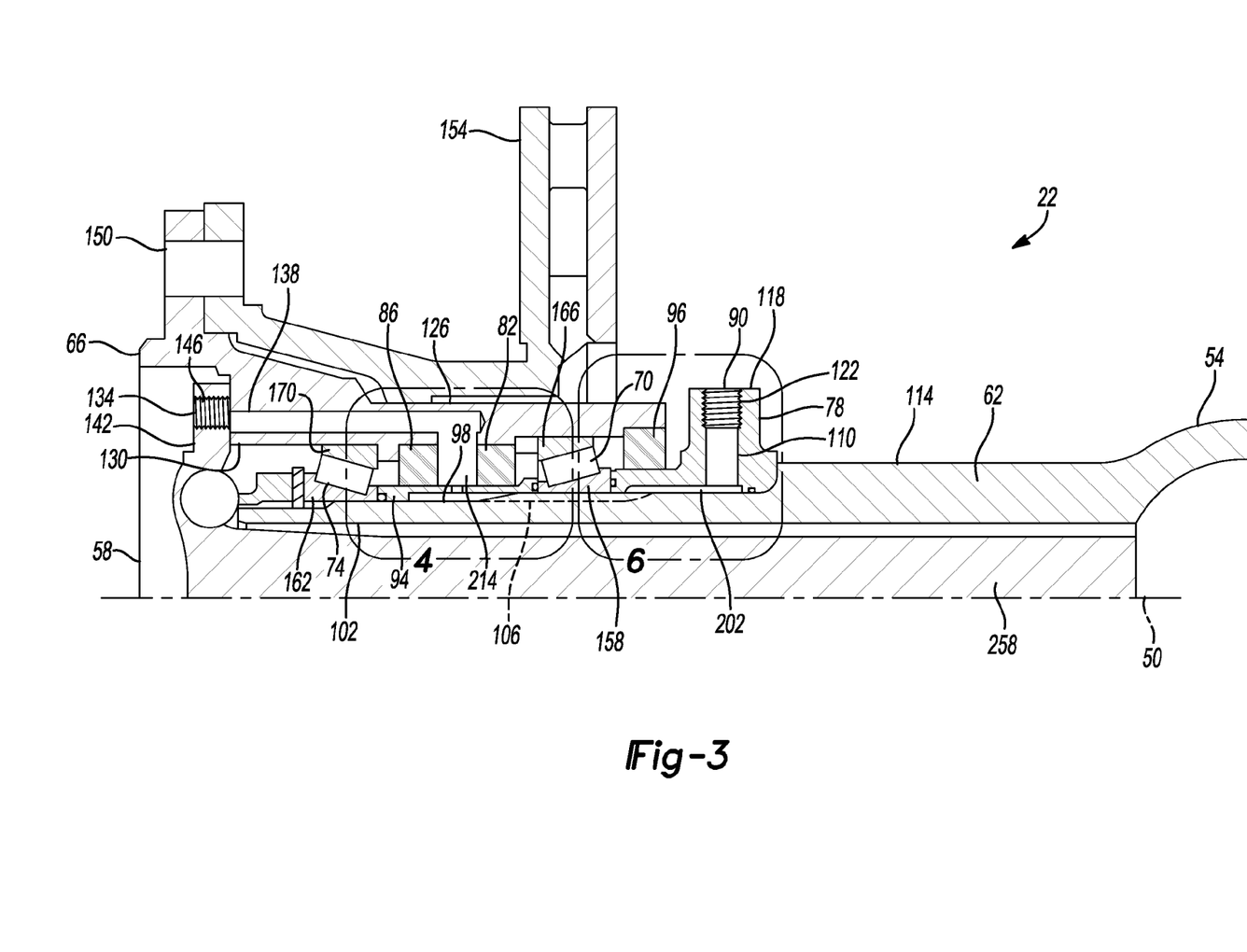
FIG. 3 is a cross-section view of the rear axle assembly of FIG. 1.

With regard to FIGS. 2 and 3, the axle assemblies 18, 22 are illustrated as cross-section views split at a rotational axis 50. The axle assemblies 18, 22 have an inboard end 54 proximal to the center of the vehicle 10, and an outboard end 58 opposite the inboard end 54 and configured to have a wheel with a tire mounted thereto. The axle assemblies 18, 22 can include an annular member 62, a hub 66, an inner hub bearing 70, an outer hub bearing 74, an abutment ring 78, a first seal 82, a second seal 86, and an air inlet port 90. The axle assemblies 18, 22 can also include a channel ring 94, and a third seal 96. The hub 66 can be rotatably disposed about the rotational axis 50.

The annular member 62 can be disposed about the rotational axis 50 and extend from the inboard end 54 toward the outboard end 58. When installed on the vehicle 10, the annular member 62 is rotationally fixed relative to the rotational axis 50. The annular member 62 can include an outer radial surface 98, an inner radial surface 102, and a channel 106 at least partially defined by the outer radial surface 98. The radial distance from the axis 50 to the outer radial surface 98 and to the inner radial surface 102 can vary along the length of the annular member 62. The channel 106 can be a groove formed in at least part of the outer radial surface 98 and running axially, i.e. longitudinally, along the annular member 62, and will be described in greater detail below.

The air inlet port 90 can be located proximal to the inboard side of the axle assembly 18, 22 for receiving pressurized air from the conduit 42. The air inlet port 90 can be disposed in either the abutment ring 78 (best shown in FIG. 6) or the annular member 62 (best shown in FIG. 5). The air inlet port 90 can include an inlet boss 110 extending radially inward from either an outer surface 114 of the annular member 62 or an outer surface 118 of the abutment ring 78. The air inlet port 90 can be perpendicular to the rotational axis 50, but it is understood that the air inlet port 90 can also be formed at an angle relative to the rotational axis 50. The inlet boss 110 can terminate radially outward of the inner radial surface 102 of the annular member 62 such that the inlet boss 110 does not fully penetrate through the annular member 62. A first portion 122 of the inlet boss 110 can be threaded to accept a threaded fitting (not shown) for fluidly coupling the conduit 42 to the air inlet port 90.

The hub 66 can include an outer radial surface 126, an inner radial surface 130, and an outlet port 134. The outlet port 134 can include an outlet boss 138 penetrating an outboard surface 142 of the hub 66 and extending therefrom toward the inboard end 54. The outlet boss 138 can be substantially parallel to the rotational axis 50. A second portion 146 of the outlet boss 138 can be threaded to accept a threaded fitting (not shown) for fluidly coupling the outlet boss 138 to the wheel 30, or 34, and tire 26. The hub 66 can generally include at least one of mounting feature 150, such as a bore or lug for example, for fixedly mounting the wheel to the hub 66. A brake rotor 154 can also be mounted to the hub 66 to rotate therewith.

The inner hub bearing 70 and outer hub bearing 74 can be radially between the annular member 62 and the inner radial surface 130 of the hub 66. The outer hub bearing 74 is spaced axially apart from the inner hub bearing 70 and is outboard of the inner hub bearing 70, while radially inward of the outlet port 134 and the outlet boss 138. The inner and outer hub bearings 70, 74 can be of any suitable type of bearing, such as roller or thrust bearings for example, and can also be tapered or angled. Accordingly, the inner and outer hub bearings 70, 74 each include an inner race 158, 162 and an outer race 166, 170 respectively. The inner races 158, 162 can abut the outer radial surface 98 of the annular member 62. The outer races 166, 170 can abut the inner radial surface 130 of the hub 66. In this way, the inner and outer hub bearings 70, 74 can support the hub 66 on the annular member 62 and allow rotation of the hub 66 about the annular member 62. The inner and outer hub bearings 70, 74 can be lubricated by grease or oil.

The first seal 82 can be disposed outboard of the inner hub bearing 70 and radially between the hub 66 and the annular member 62. The first seal 82 can be configured to form a seal between the hub 66 and the channel ring 94. The second seal 86 can be axially apart from and outboard of the first seal 82, while inboard of the outer hub bearing 74. The second seal 86 can be radially between the hub 66 and the annular member 62. The second seal 86 can be configured to form a seal between the hub 66 and the channel ring 94. The first and second seals 82, 86 can be designed to withstand air pressure on one side, and oil or grease on the other, such that the seals 82, 86 can act to keep the pressurized air and any bearing lubricants separate.

Figure 5:
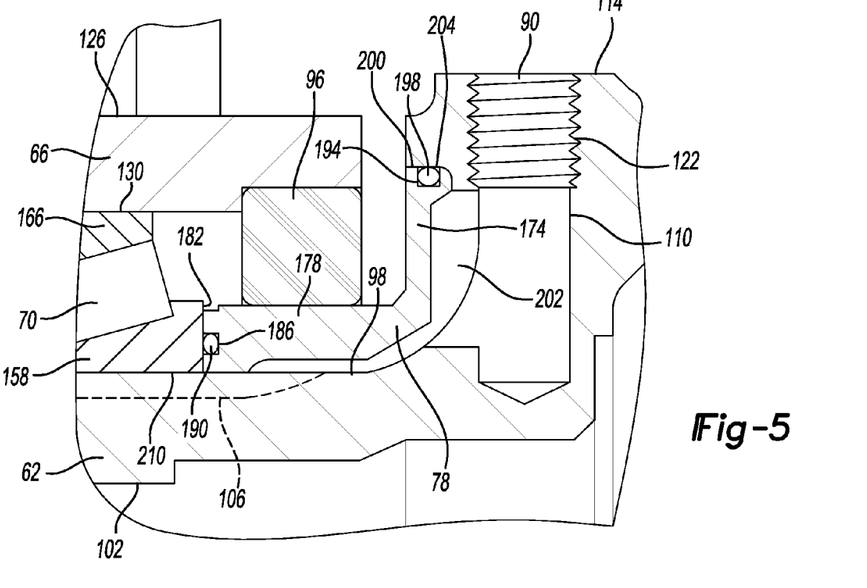
FIG. 5 is a detailed view of a portion of the front axle assembly of FIG. 2.
Figure 6:
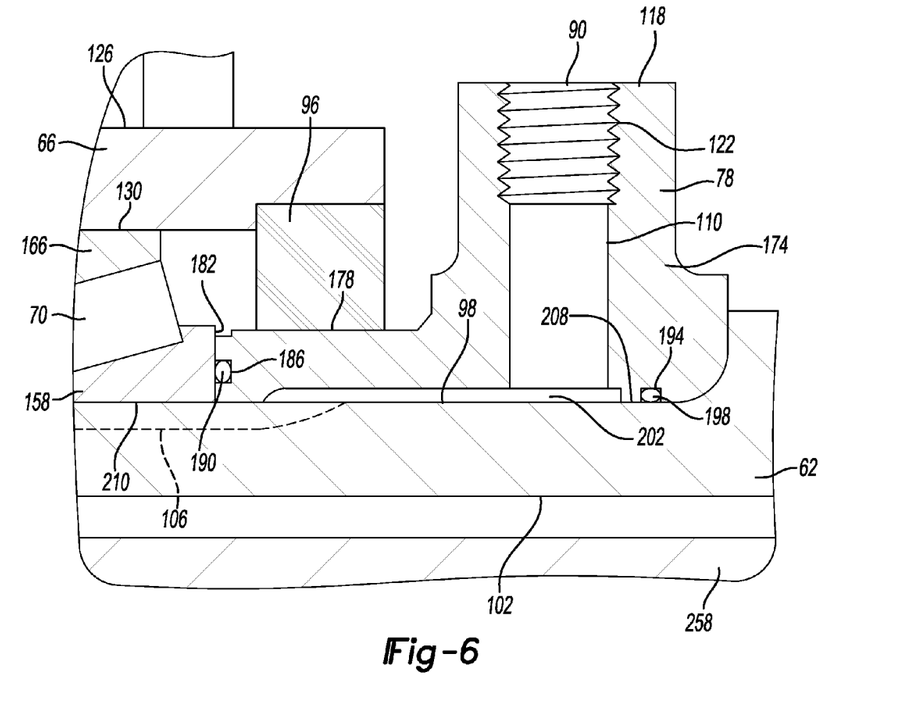
FIG. 6 is a detailed view of a portion of the rear axle assembly of FIG. 5.

With specific regard to FIGS. 5 and 6, the abutment ring 78 can be inboard of the inner hub bearing 70 and can have an inboard portion 174 proximal to the inboard end 54, and an outboard portion 178 proximal to the outboard end 66. The abutment ring 78 can be rotationally fixed relative to the annular member 62. The outboard portion 178 can be radially between the hub 66 and the outer radial surface 98 of the annular member 62. The outboard portion 178 can abut and form a seal with an inboard side 182 of the inner hub bearing 70 to encapsulate a portion of the channel 106. The outboard portion 178 can include a first annular groove 186 for receiving a first o-ring 190. The first o-ring 190 can form the seal between the inner race 158 of the inner hub bearing 70 and the abutment ring 78. The inboard portion 174 can extend radially outward from the outboard portion 178, such that the inboard portion 174 has a larger outer radius than the outboard portion 178. The inboard portion 174 can abut and form a seal with the annular member 62. The inboard portion 174 can include a second annular groove 194 for receiving a second o-ring 198. The second o-ring 198 can form the seal between the abutment ring 78 and the annular member 62. As shown in FIG. 5, the second annular groove 194 can be formed in an outermost radial surface 200 of the inboard portion 174 to allow the second o-ring 198 to form a seal with a shoulder 204 on the annular member 62. As shown in FIG. 6, the second annular groove 194 can alternatively be formed in an inner radial surface 208 of the inboard portion 174 to allow the second o-ring 198 to form a seal with the outer radial surface 98 of the annular member 62. The abutment ring 78 and the annular member 62 can define a first pocket 202 therebetween. The first pocket 202 can be in fluid communication with the inlet boss 110 and can extend from the inlet boss 110 toward the outboard end 58, between the outboard portion 178 and the annular member 62. The first pocket 202 can be in fluid communication with the channel 106 to allow air to flow from the inlet port 90 to the channel 106.

The third seal 96 can be located radially between the outboard portion 178 of the abutment ring 78 and the hub 66, and form a seal therebetween. The third seal 96 can prevent contaminants from penetrating between the hub 66 and the abutment ring 78 and reaching the inner hub bearing 70, while preventing leakage of bearing lubrication.

Returning to FIGS. 2 and 3 generally, the channel 106 can be formed in the outer radial surface 98 of the annular member 62 as an open channel and can extend from the first pocket 202 toward the outboard end 58. The channel 106 can terminate inboard of the outer hub bearing 74, with the channel 106 being radially inward of the inner hub bearing 70 and the first seal 82. Since the channel 106 is openly formed in the outer radial surface 98, the abutment ring 78 and an inner radial surface 210 (best shown in FIG. 4) of the inner race 158 can encapsulate a portion of the channel 106. The channel ring 94 can also encapsulate a portion of the channel 106 as will be discussed in detail below. The channel 106 can be located at a compressive stress quadrant of the annular member 62 and an unloaded section of the inner hub bearing 70. Generally, such compressive stress quadrant and unloaded section are located at the top of the annular member 62 relative to the ground when the axle assemblies 18, 22 are installed on the vehicle 10. This location of the channel 106 minimizes the stress concentration on the channel 106 and on the inner hub bearing 70 due to the channel 106 geometry and the weight of the vehicle 10. The channel 106 eliminates the need for a separate bearing carrier and a larger diameter inner hub bearing. Thus, the axle assemblies 18, 22 can be accommodated on axle designs with limited radial space, such as imposed by a specific diameter of brake disc for example. Multiple channels 106 may also be used to reduce stress concentrations on any individual channel 106.

A second pocket 214 can be defined by the channel ring 94, the hub 66, and the first and second seals 82, 86. The second pocket 214 extends radially outward from the channel ring 94, and is axially between the first and second seals 82, 86. The second pocket 214 can terminate radially inward of the outer radial surface 126 of the hub 66 and can extend to the outlet boss 138 to be in fluid communication with the outlet port 134.

Figure 4:
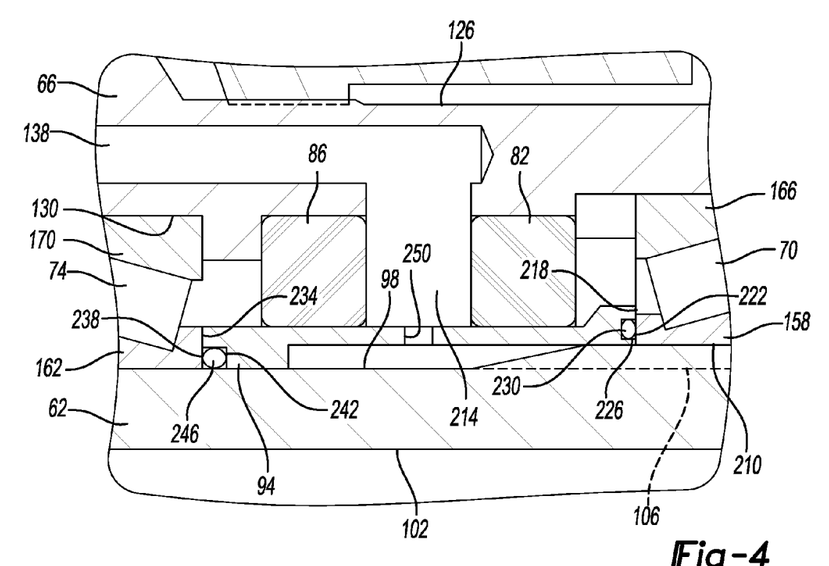
FIG. 4 is a detailed view of a portion of the front and rear axle assemblies of FIG. 2 and FIG. 3.

With specific regard to FIG. 4, the channel ring 94 can be radially inward of the first and second seals 82, 86 and radially outward of the outer radial surface 98 of the annular member 62. The channel ring 94 can extend over at least a portion of the channel 106. The first and second seals 82, 86 can form a seals between the channel ring 94 and the inner radial surface 130 of the hub 66. The channel ring 94 can form a seal with the outer radial surface 98 of the annular member 62 to encapsulate a portion of the channel 106. The channel ring 94 can be axially between the inner and outer hub bearings 70, 74, such that an inboard side 218 of the channel ring 94 can abut and form a seal with an outboard side 222 of the inner race 158 of the inner hub bearing 70. The inboard side 218 can include a third annular groove 226 and a third o-ring 230 accepted therein for forming the seal. An outboard side 234 of the channel ring 94 can abut an inboard side 238 of the inner race 234 of the outer hub bearing 74. The outboard side 234 can include a fourth annular groove 242 for accepting a fourth o-ring 246 therein to form a seal with the inboard side 238, the annular member 62, or both. The channel ring 94 can be rotationally fixed relative to the annular member 62. The channel ring 94 can include an aperture 250 penetrating radially outward through the channel ring 94, to fluidly couple the channel 106 with the second pocket 214.

Thus by the present teachings, the inlet port 90, inlet boss 110, first pocket 202, channel 106, second pocket 214, outlet boss 138, and outlet port 134 are fluidly coupled to form a flow path for pressurized air that flows directly between the inner race 158 of the inner hub bearing 70 and the annular member 62 then radially outward between the inner and outer hub bearings 70, 74.

With specific regard to the front axle assembly 18, as illustrated in FIG. 2, the annular member 62 can be coupled to a steering knuckle 254. Generally, for the front axle assembly 18, the inlet port 90 can be formed in the annular member 62 or a portion of the steering knuckle 254 (best shown in FIG. 5). However, it will be appreciated that the inlet port 90 can be formed in the abutment ring 78 as shown in FIG. 6. In the case where the front wheels of the vehicle 10 are driven by the engine, such as in a front-wheel drive, or all-wheel drive vehicle for example, the front axle assembly 18 can include an axle shaft (not shown) rotatably disposed about the rotational axis 50 and radially inward of the annular member 62. The axle shaft can be adapted to receive rotational input on the inboard end 54 and be coupled to the hub 66 to drive the wheel on the outboard end 58.

With specific regard to the rear axle assembly 22, as illustrated in FIG. 3, the annular member 62 can be an axle housing. Generally, for the rear axle assembly 22, the inlet port 90 is formed in the abutment ring 78 (best shown in FIG. 6). However, it will be appreciated that the inlet port 90 can be formed directly in a portion of the annular member 62 as shown in FIG. 5. The rear axle assembly 22 can include an axle shaft 258 rotatably disposed about the rotational axis 50, radially inward of the annular member 62, and coupled to the hub 66 on the outboard end 58. In the case where the rear wheels of the vehicle 10 are driven by the engine, the axle shaft 258 can be adapted to receive rotational input on the inboard end 54 and drive the wheel on the outboard end 58.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. An axle assembly comprising:
    an inner hub assembly having an annular member and an abutment ring, the annular member being disposed about a rotational axis, the abutment ring being fixedly coupled to the annular member, wherein one of the annular member and the abutment ring has an inlet boss that defines an inlet port;
    a drive hub that is adapted to be to be coupled to a wheel, the drive hub defining an outlet port;
    first and second hub bearings supporting the drive hub for rotation on the annular member; and
    first and second shaft seals sealingly engaged to the drive hub and the inner hub assembly;
    wherein a first fluid conduit is partly defined by the abutment ring, the first fluid conduit being in fluid communication with the air inlet port; and
    wherein the second shaft seal is spaced apart from the first shaft seal along the rotational axis to at least partially define a second fluid conduit, the second fluid conduit coupling the outlet port in fluid communication with the first fluid conduit.

2. The axle assembly of claim 1, wherein a seal member is disposed between the inner hub bearing and the abutment ring.

3. The axle assembly of claim 1, wherein the first fluid conduit is formed in part by one or more grooves formed on the annular member.

4. The axle assembly of claim 3, wherein the one or more grooves are positioned on a compressive stress quadrant of the annular member.

5. The axle assembly of claim 1, wherein the air inlet boss is integrally and unitarily formed with the annular member.

6. The axle assembly of claim 1, further comprising an axle shaft rotatably disposed about the rotational axis, the axle shaft extending into the annular member, and the axle shaft being coupled to the hub for common rotation about the rotational axis.

7. The axle assembly of claim 1, wherein the air inlet boss is integrally and unitarily formed with the abutment ring.

8. An axle assembly comprising:
    a steering knuckle assembly having a steering knuckle and an abutment ring, the steering knuckle including an annular member, which is disposed about a rotational axis, and an inlet boss that defines an inlet port, the abutment ring being fixedly and sealingly engaged to the steering knuckle;the annular member including an outer radial surface, an inner radial surface, and a channel defined by the outer radial surface; and
    a drive hub that defines an outlet port,;
    first and second hub bearings supporting the drive hub for rotation about the annular member of the steering knuckle;
    first and second shaft seals sealingly engaged to the drive hub and the steering knuckle assembly;
    wherein the abutment ring is disposed inboard of the first and second hub bearings and defines a first fluid conduit that is in fluid communication with the inlet port;

wherein a second fluid conduit is in fluid communication with the first fluid conduit and the outlet port, the second fluid conduit extending in a radial direction between the first and second shaft seals.

9. The axle assembly of claim 8, wherein a channel is formed in the steering knuckle, the channel coupling the first and second fluid conduits.

10. The axle assembly of claim 9, wherein the channel is positioned on a compressive stress quadrant of the annular member.

11. The axle assembly of claim 8, wherein the annular member comprises a hollow shaft and a channel ring, the channel ring being disposed radially between the hollow shaft and the first and second shaft seals.

12. The axle assembly of claim 8, further comprising an axle shaft rotatably disposed about the rotational axis, the axle shaft extending into the annular member, and the axle shaft being coupled to the drive hub for common rotation.

13. An axle assembly comprising:
- an axle shaft rotatably disposed about a rotational axis, the axle shaft being adapted on the outboard end to drive a wheel;
- an axle housing having an annular member and an abutment ring, the annular member being disposed about the axle shaft, the abutment ring defining an inlet port;
- a drive hub coupled to the axle shaft and defining an outlet port;
- first and second hub bearings disposed between the axle housing and the drive hub, the first and second hub bearings supporting the drive hub for rotation about the rotational axis relative to the axle housing; and
- first and second shaft seals disposed radially between the axle housing and the drive hub;
- wherein the abutment ring is disposed on the annular member inboard of the first and second hub bearings and defines a first conduit that is in fluid communication with the inlet port; and
- wherein a second fluid conduit extends in a radial direction between the annular member and the drive hub and is at least partly defined by the first and second shaft seals, the second fluid conduit coupling the first fluid conduit to the outlet port.

14. The axle assembly of claim 13, wherein a channel is formed in the annular member, the channel coupling the first and second fluid conduits.

15. The axle assembly of claim 14, wherein the channel is positioned on a compressive stress quadrant of the annular member.

16. The axle assembly of claim 13, wherein the annular member comprises a hollow shaft and a channel ring, the channel ring being disposed radially between the hollow shaft and the first and second shaft seals.

* * * * *